United States Patent [19]
Miyake et al.

[11] Patent Number: 5,473,470
[45] Date of Patent: Dec. 5, 1995

[54] POLARIZATION DETECTOR

[75] Inventors: Takahiro Miyake, Soraku; Yoshio Yoshida; Yasuo Nakata, both of Nara; Yukio Kurata, Tenri, all of Japan

[73] Assignee: Sharp Kabushiki Kaisha, Osaka, Japan

[21] Appl. No.: 93,920

[22] Filed: Jul. 21, 1993

[30] Foreign Application Priority Data

Sep. 28, 1992 [JP] Japan .................................. 4-258424

[51] Int. Cl.$^6$ .............................. G02B 5/18; G02B 5/30; G02B 27/28; G11B 7/00
[52] U.S. Cl. ..................... 359/485; 359/566; 359/569; 369/109; 369/110
[58] Field of Search ........................... 359/15, 566, 569, 359/485; 369/109, 110, 44.23

[56] References Cited

U.S. PATENT DOCUMENTS

| | | |
|---|---|---|
| 4,547,664 | 10/1985 | Vogt et al. . |
| 5,013,107 | 5/1991 | Biles ........................................ 369/103 |
| 5,029,154 | 7/1991 | Sumi et al. . |
| 5,085,496 | 2/1992 | Yoshida et al. . |
| 5,101,389 | 3/1992 | Ohuchida et al. . |
| 5,272,550 | 12/1993 | Dickson et al. .......................... 359/3 |

FOREIGN PATENT DOCUMENTS

| | | |
|---|---|---|
| 0091068 | 10/1983 | European Pat. Off. . |
| 0390610A2 | 10/1990 | European Pat. Off. . |
| 0462757 | 12/1991 | European Pat. Off. . |
| 2259702 | 10/1990 | Japan . |

OTHER PUBLICATIONS

"Dielectric Surface–Relief Gratings with High Diffraction Efficiency" by K. Yokomori, Applied Optics, vol. 23, #14, pp. 2303–2310, Jul. 15, 1984.

"Dielectric Surface–Relief Gratings with High Diffraction Efficiency" by K. Yokomori, Ricoh Tech. Report, #12, pp. 21–26, Dec. 1984 (English translation with Japanese Abstract thereof).

*Primary Examiner*—Martin Lerner

[57] ABSTRACT

A polarization detector includes a polarization diffraction element having a substrate with two facing surfaces which are placed in parallel with each other, a first diffraction grating formed on one surface of the substrate, and a second diffraction grating formed on the other surface of the substrate, with light being incident upon the first diffraction grating. Further, each grating pitch of the first diffraction grating and the second diffraction grating are nearly equal to a wavelength of the incident light. A limiting member is also included for limiting an incident region of the incident light with respect to the polarization diffraction element. The limiting member is formed on a light incident side of the first diffraction grating. Further, a converging lens is included for respectively converging light transmitted through the first diffraction grating and the second diffraction grating and light diffracted by the first diffraction grating and the second diffraction grating into different beam spots. Finally, a pair of photodetectors are included for detecting each optical intensity of the two beam spots converged by the converging lens.

12 Claims, 9 Drawing Sheets

POLARIZATION DETECTOR

BACKGROUND OF THE INVENTION

1. Field of the Invention

The present invention relates to a polarization detector used for optical pickup and the like, and more particularly to a polarization detector equipped with a polarization diffraction element for separating an incident light into two light beams with different polarization components.

2. Description of the Related Art

FIG. 8 shows a cross-sectional view of a polarization diffraction element 100. The polarization diffraction element 100 includes a transparent substrate 101 made of glass or the like, on one surface of which a diffraction grating 102 represented by hatching is formed. The grating pitch of the diffraction grating 102 is formed so as to nearly correspond to the wavelength of the light to be used. For example, the diffraction grating 102 is formed of a photoresist, having a thickness of 1 µm and a grating pitch of 0.5 µm. The diffraction grating 102 is formed by a two-beam interference method or the like.

When the grating pitch of the diffraction grating 102 is formed so as to be nearly equal to a light wavelength, as described above, the following polarization characteristics are known to be obtained. (See K. Yokomori, "Dielectric Surface-Relief Gratings with High Diffraction Efficiency", Applied Optics Vol. 23, No. 14, pp. 2303, 1984.)

As shown by the arrow in FIG. 8, the diffraction grating 102 of the polarization diffraction element 100 having the above-mentioned structure allows a P-polarized light $L_P$ to pass therethrough at nearly 100% and an S-polarized light $L_S$ to diffract at nearly 100%. The P-polarized light $L_P$ has an electrical field which vibrates in the direction parallel the drawing sheet of FIG. 8. The S-polarized light $L_S$ has an electrical field which vibrates in the normal direction with respect to the drawing sheet surface.

When light L, for example, having a wavelength of 0.8 µm is incident upon the above-mentioned polarization diffraction element 100, a majority of the P-polarized light $L_P$ passes through the diffraction grating 102 as a zeroth-order diffracted light $L_a$, with a minority being diffracted as a first-order diffracted light $L_b$. On the other hand, a majority of the S-polarized light $L_S$ is diffracted by the diffraction grating 102 as a first-order diffracted light $L_b$, with a minority passing through the diffraction grating 102 as a zeroth-order diffracted light $L_a$.

As a polarization diffraction element used for optical pickup of a magneto-optical element utilizing the above-mentioned polarization characteristics, Japanese Laid-Open Patent Publication No. 2-259702 by the present inventors discloses a polarization diffraction element, a polarization detector, etc. These polarization diffraction elements have a structure formed by considering the influence of wavelength fluctuation of an incident light, the configuration in the case where a polarization detector including a photodetector is constituted, the improvement of the degree of separation of P- and S-polarized lights.

FIG. 9 shows an example of the abovementioned polarization diffraction element. A polarization diffraction element 1.10 includes a transparent flat substrate 111 made of glass or the like. On both surfaces of the substrate 111, a first diffraction grating 112 and a second diffraction grating 113 are formed, respectively. A grating pitch $D_1$ of the first diffraction grating 112 and a grating pitch $D_2$ of the second diffraction grating 113 are set so as to nearly equal the wavelength λ of the incident light L. In addition, the groove direction of the first and second diffraction gratings 112 and 113 corresponds to the direction of a normal line with respect to the drawing sheet surface of FIG. 9.

FIG. 10 is a cross-sectional view of the first and second diffraction gratings 112 and 113. As shown in this figure, the first diffraction grating 112 has a plurality of sinusoidal convex portions 112a with the grating pitch $D_1$, each grating pitch $D_1$ being the same, further the second diffraction grating 113 has a plurality of sinusoidal convex portions 113a with the grating pitch $D_2$, each grating pitch $D_2$ being the same. In this case, the grating pitch $D_2$ is set so as to be slightly larger than the grating pitch $D_1$. The first diffraction grating 112 and the second diffraction grating 113 can be formed as a relief type diffraction grating by, for example, etching the substrate 111.

The operation of the polarization diffraction element 110 with the above-mentioned structure will be described.

The first diffraction grating 112 and the second diffraction grating 113 allow the P-polarized light $L_p$ of the incident light L to pass therethrough at nearly 100%, and allow the S-polarized light $L_S$ to diffract at nearly 100%. Since the grating pitch $D_2$ is larger than the grating pitch $D_1$, in the case where the incident light L with a predetermined wavelength is incident upon the polarization diffraction element 110 through the first diffraction grating 112, the following is caused: As shown by an arrow in FIG. 9, a transmitted light $L_c$ transmitted through the first and second diffraction gratings 112 and 113 and a diffracted light $L_d$ diffracted by the first and second diffraction gratings 112 and 113 output from the polarization diffraction element 110 at an angle difference of angle α therebetween.

At this time, the incident light L is incident upon the first diffraction grating 112 at an incident angle $\theta_1$, and the S-polarized light $L_S$ of the incident light L is diffracted in a direction so as to form an angle $\theta_2$ with respect to a normal line n of the polarization diffraction element 110. In addition, the S-polarized light $L_S$ is diffracted in a direction so as to form an angle $\theta_3$ with respect to a normal line n and output from the polarization diffraction element 110. In this case, the difference angle, angle α, is represented by $\theta_1-\theta_3$. Moreover, the angles $\theta_1$, $\theta_2$, and $\theta_3$ satisfy the following Formula (1):

$$Sin\theta_1+Sin\theta_2=\lambda/D_1$$

$$Sin\theta_2+Sin\theta_3=\lambda/D_2 \quad (1)$$

where λ is an oscillation wavelength of the incident light.

FIG. 11 is a front view schematically showing a polarization detector equipped with the polarization diffraction element 110 which functions as described above. The polarization detector includes the polarization diffraction element 110, a converging lens 120 for converging light which output from the polarization diffraction element 110, and a pair of photodetectors 130a and 130b for detecting the intensity of light converged by the converging lens 120. The pair of photodetectors 130a and 130b are provided in one package 130.

In the polarization detector with the abovementioned structure, a data signal is given to the polarization diffraction element 110 as the incident light L, and the incident light L is separated into the P-polarized light Lp and the S-polarized light $l_S$ by the polarization diffraction element 110, as described above, output from the polarization diffraction element 110. The outgoing light is converged on the photodetectors 130a and 130b by the converging lens 120, whereby the optical signal is converted into an electrical signal by the photodetectors 130a and 130b.

In the above-mentioned polarization diffraction element 110, the difference between the grating pitch $D_1$ of the first diffraction grating 112 and the grating pitch $D_2$ of the second diffraction grating 113 is very small. Thus, the fluctuation of the difference of angle $\alpha$ caused by the wavelength fluctuation of the incident light L as shown in FIG. 9 is small and there is an effect that a positional shift of beam spots converged on the photodetectors 130a and 130b can be prevented.

A small-sized and light-weight optical pickup device has been realized by incorporating the polarization detector into the optical pickup.

However, in the above-mentioned polarization detector, a reflected light generated in the polarization diffraction element 110 and the incident light L cause interference. Because of this, the intensity of light from the polarization diffraction element 110 is fluctuated and a noise is caused in the signal reproduced by the photodetectors 130a and 130b, deteriorating the quality of the signal.

This problem will be described in detail as follows:

FIG. 12A is a cross-sectional view showing the polarization diffraction element 110. FIG. 12B shows the shape of beam spots on the first diffraction grating 112. As shown in FIG. 12A, the S-polarized light $L_S$ of the incident light L with respect to the polarization diffraction element 110 is diffracted by the first diffraction grating 112 to become a first-order diffracted light $L_1$. Moreover, the first-order diffracted light $L_1$ is separated into an outgoing light $L_3$ and a reflected light $L_2$. The outgoing light $L_3$ is light which undergoes the first order diffraction by the second diffraction grating 113. The reflected light $L_2$ is light which is reflected from the second diffraction grating 113. Because of this, as shown in FIG. 12B, two beam spots of the incident light L (mainly, the S-polarized light $L_S$) and the reflected light $L_2$ are formed, and the light which corresponds to an overlapped portion of both of the beam spots is an interference light $L_i$. As shown in FIG. 12A, among the interference light $L_i$, a light $L_{i1}$ reflected from the first diffraction grating 112 undergoes first-order diffraction by the second diffraction grating 113 to become a light $L_{i2}$, and the light $L_{i2}$ is irradiated to the photodetector 130b (not shown in FIG. 12A) together with the original S-polarized light $L_S$.

As described above, the intensity of the interference light $L_i$ proceeding to the photodetector 130b is determined by the phase difference between the reflected light $L_2$ from the first diffraction grating 112 and the S-polarized light $L_S$ of the incident light L. The phase difference depends on an oscillation wavelength of a semiconductor laser which is the light source of the incident light L. However, since the oscillation wavelength of the laser fluctuates, the phase difference also fluctuates, resulting in the fluctuation of the intensity of the interference light $L_i$. The fluctuation of the light intensity causes a noise in the data signal transmitted through the polarization diffraction grating 110, deteriorating the quality of the signal. The reason for the fluctuation of the semiconductor laser is as follows: The semiconductor laser is weak to backward light, so that in the case where the semiconductor laser is used for optical pickup, a laser driving current is overlapped with a high frequency current for the purpose of suppressing the backward light.

In the case of the P-polarized light $L_p$ of the incident light L, assuming that the incident angle of the zeroth-order diffraction light with respect to the second diffraction grating 113 is about 35°, a reflected light is hardly generated as shown in FIG. 13. Thus, the above-mentioned problems do not arise.

SUMMARY OF THE INVENTION

The polarization detector of the present invention, includes:

a polarization diffraction element having a substrate with two facing surfaces which are placed in parallel with each other, a first diffraction grating formed on one surface of the substrate, and a second diffraction grating formed on the other surface of the substrate, light being incident upon the first diffraction grating, each grating pitch of the first diffraction grating and the second diffraction grating being nearly equal to a wavelength of the incident light;

a limiting member for limiting an incident region of the incident light with respect to the polarization diffraction element, formed on a light incident side of the first diffraction grating;

a converging lens for respectively converging light transmitted through the first diffraction grating and the second diffraction grating and light diffracted by the first diffraction grating and the second diffraction grating into different beam spots; and a pair of photodetectors for detecting each optical intensity of the two beam spots converged by the converging lens.

In one embodiment of the present invention, the limiting member is formed of a light-intercepting member, and on a surface of the polarization diffraction element on which the first diffraction grating is formed, the light-intercepting member limits an incident width of the incident light to a limit width thereof in a vertical direction with respect to a groove direction of the first diffraction grating.

In another embodiment of the present invention, the light-intercepting member is formed of a light-intercepting film formed on the first diffraction grating.

In another embodiment of the present invention, the light-intercepting member is formed so as to prevent interference between light diffracted by the first diffraction grating and reflected from the other surface of the substrate and the incident light.

In another embodiment of the present invention, the light-intercepting member is formed of a light-intercepting film formed on the first diffraction grating.

In another embodiment of the present invention, the limit width is $4t_0 \cdot \tan\theta_2$ or less, where $t_0$ is a thickness of the substrate of the polarization diffraction element and $\theta_2$ is a diffraction angle of the incident light in the substrate by the first diffraction grating.

In another embodiment of the present invention, the limiting member is formed of an aperture and limits a width of the incident light to a limit width thereof on a surface vertical with respect to a proceeding direction of the incident light.

In another embodiment of the present invention, the limit width is $4t_0 \cdot \tan\theta_2 \cdot \sin(90°\theta_1)$ or less, where $t_0$ is a thickness of the substrate of the diffraction grating element, $\theta_1$ is an incident angle of the incident light, and $\theta_2$ is a diffraction angle of the incident light in the substrate by the first diffraction grating.

In another embodiment of the present invention, a conversion member is further formed on a light incident side of the first diffraction grating, the conversion member converting the incident light to a spherical wave and allowing the spherical wave to be incident upon the polarization diffraction element.

In another embodiment of the present invention, the conversion member is selected from the group consisting of a lens and an aperture.

In another embodiment of the present invention, the converging lens is provided on the light incident side of the polarization diffraction element.

In another embodiment of the present invention, the converging lens is provided on a light outgoing side of the polarization diffraction element.

In another aspect of the present invention, a polarization detector, includes:

a polarization diffraction element having a substrate with two facing surfaces which are placed in parallel with each other, a first diffraction grating formed on one surface of the substrate, and a second diffraction grating formed on the other surface of the substrate, light being incident upon the first diffraction grating, each grating pitch of the first diffraction grating and the second diffraction grating being nearly equal to a wavelength of the incident light;

a conversion member for converting the incident light to a spherical wave and allowing the spherical wave to be incident upon the polarization diffraction element, formed on a light incident side of the first diffraction grating;

a converging lens for respectively converging light transmitted through the first diffraction grating and the second diffraction grating and light diffracted by the first diffraction grating and the second diffraction grating into different beam spots; and a pair of photodetectors for detecting each optical intensity of the two beam spots converged by the converging lens.

In one embodiment of the present invention, the conversion member is selected from the group consisting of a lens and an aperture.

In another embodiment of the present invention, the converging lens is provided on the light incident side of the polarization diffraction element.

In another embodiment of the present invention, the converging lens is provided on a light outgoing side of the polarization diffraction element.

In another aspect of the present invention, a polarization detector, includes:

a polarization diffraction element having a substrate with two facing surfaces which are placed in parallel with each other, a first diffraction grating formed on one surface of the substrate, and a second diffraction Grating formed on the other surface of the substrate, light being incident upon the first diffraction grating, each grating pitch of the first diffraction grating and the second diffraction Grating being nearly equal to a wavelength of the incident light, the first diffraction Grating being formed with a width of $4t_0 \cdot \tan\theta_2$ or less in a vertical direction with respect to a groove direction of the first diffraction grating, where $t_0$ is a thickness of the substrate and $\theta_2$ is a diffraction angle of the incident light in the substrate by the first diffraction grating;

a converging lens for respectively converging light transmitted through the first diffraction grating and the second diffraction grating and light diffracted by the first diffraction grating and the second diffraction grating into different beam spots; and a pair of photodetectors for detecting each optical intensity of the two beam spots converged by the converging lens.

In another aspect of the present invention, a polarization detector, includes:

a polarization diffraction element having a substrate with two facing surfaces which are placed in parallel with each other, a first diffraction grating formed on one surface of the substrate, and a second diffraction grating formed on the other surface of the substrate, light with a wavelength which is to fluctuate being incident upon the first diffraction grating, each grating pitch of the first diffraction grating and the second diffraction grating being nearly equal to a wavelength of the incident light, a thickness of the substrate being $W_0/\{4\tan\theta_2 \cdot \sin(90°-\theta_1)\}$ or more, where $W_0$ is a width of the incident light on a surface vertical with respect to a proceeding direction of the incident light, $\theta_1$ is an incident angle of the incident light, and $\theta_2$ is a diffraction angle of the incident light in the substrate by the first diffraction grating;

a converging lens for respectively converging light transmitted through the first diffraction grating and the second diffraction grating and light diffracted by the first diffraction grating and the second diffraction grating into different beam spots; and a pair of photodetectors for detecting each optical intensity of the two beam spots converged by the converging lens.

In the polarization detector of the present invention, light among an incident light, which is diffracted by the first diffraction grating and reflected from the second diffraction grating and an incident light can be prevented from interfering each other, by limiting an incident region with respect to the polarization diffraction element.

In addition, the fluctuation of the intensity of light converged on the photodetectors, caused by the above-mentioned interference, can be decreased by making a spherical wave incident upon the polarization diffraction element.

The interference or the fluctuation of the light intensity caused by the interference can be prevented by limiting the width of the first diffraction grating and making the thickness of the substrate larger than the predetermined one in the polarization diffraction element.

Thus, the invention described herein makes it possible to provide a polarization detector in which a satisfactory data signal with less noise component is detected, even though a laser driving current to be applied to an optical source is overlapped with a high frequency current. This is achieved preventing the interference between the incident light and the diffracted reflected light of the incident light or by minimizing the influence of the interference.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrating examples with reference to the drawings.

EXAMPLE 1

Figure 1:
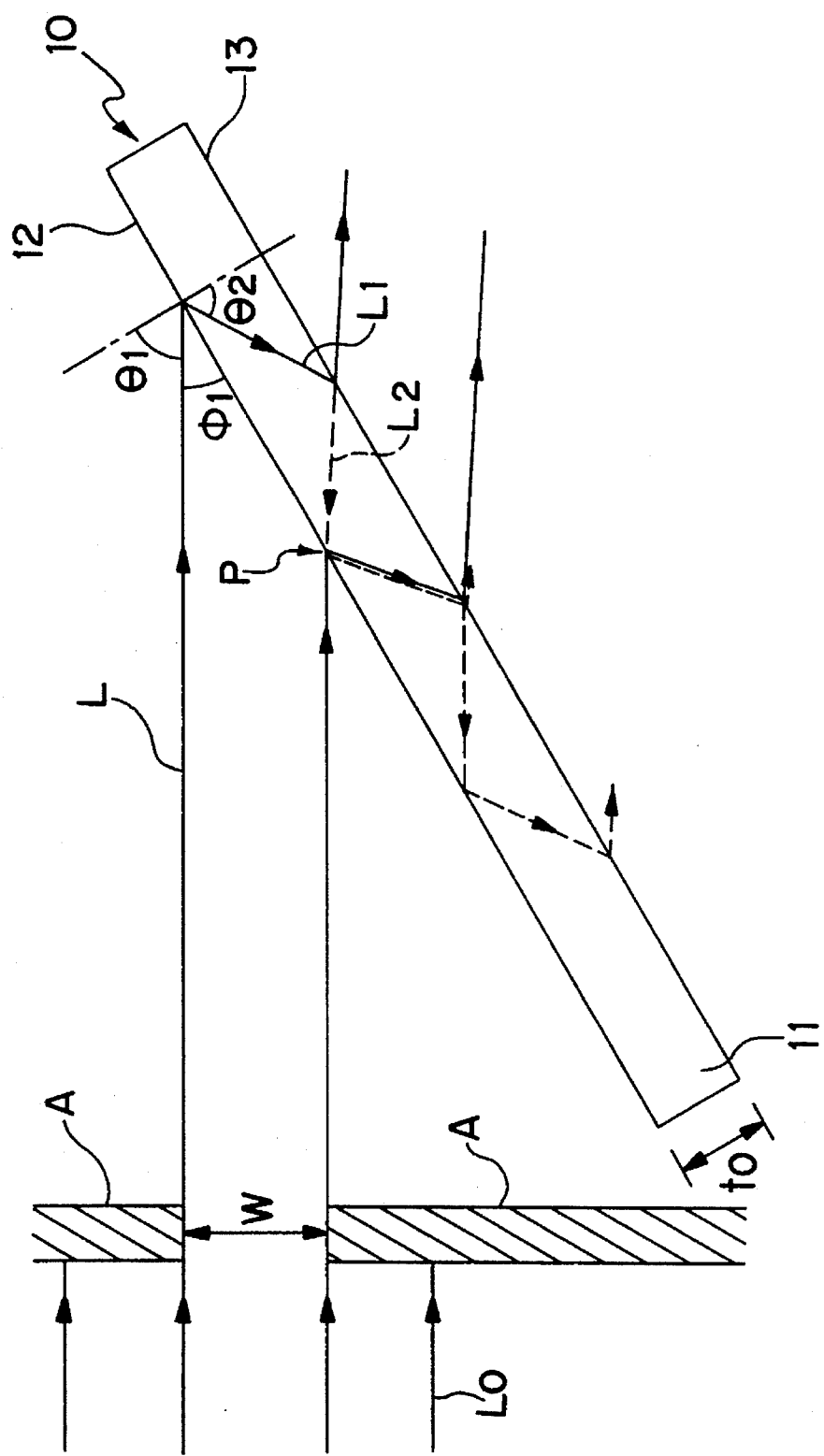
FIG. 1 is a plan view schematically showing the periphery of a polarization diffraction element in a polarization detector of the first example according to the present invention.
Figure 9:
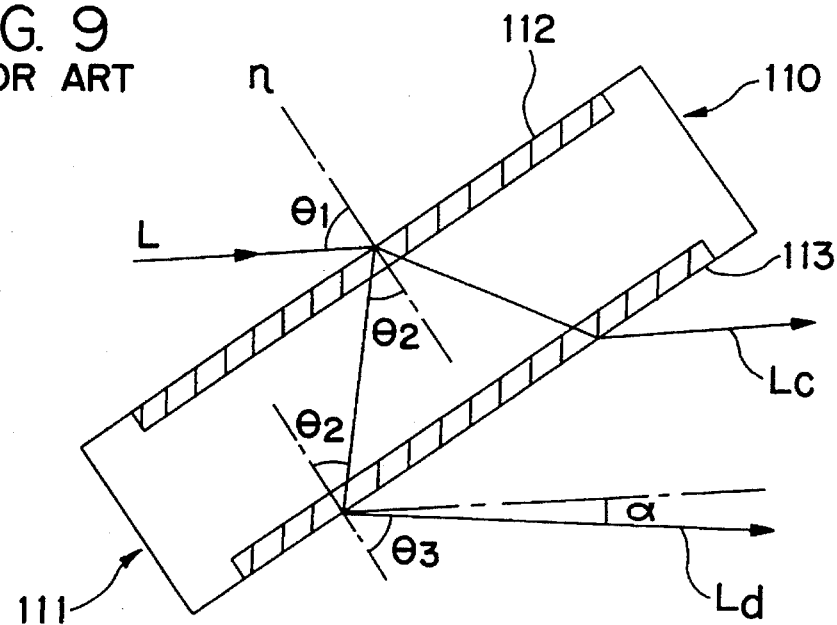
FIG. 9 is a plan view showing a polarization diffraction element used in the conventional polarization detector.
Figure 10:
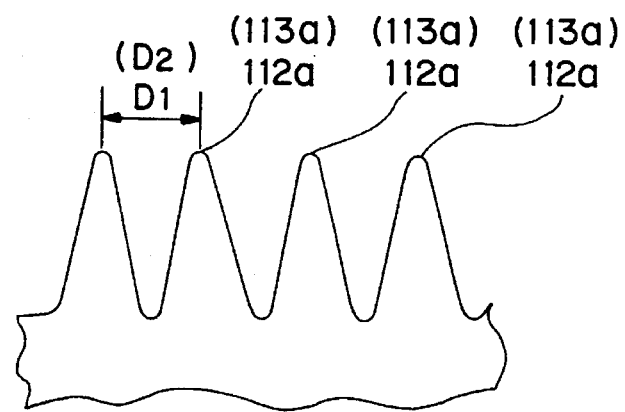
FIG. 10 is a cross-sectional view showing a diffraction grating of the polarization diffraction element shown in FIG. 9.
Figure 13:
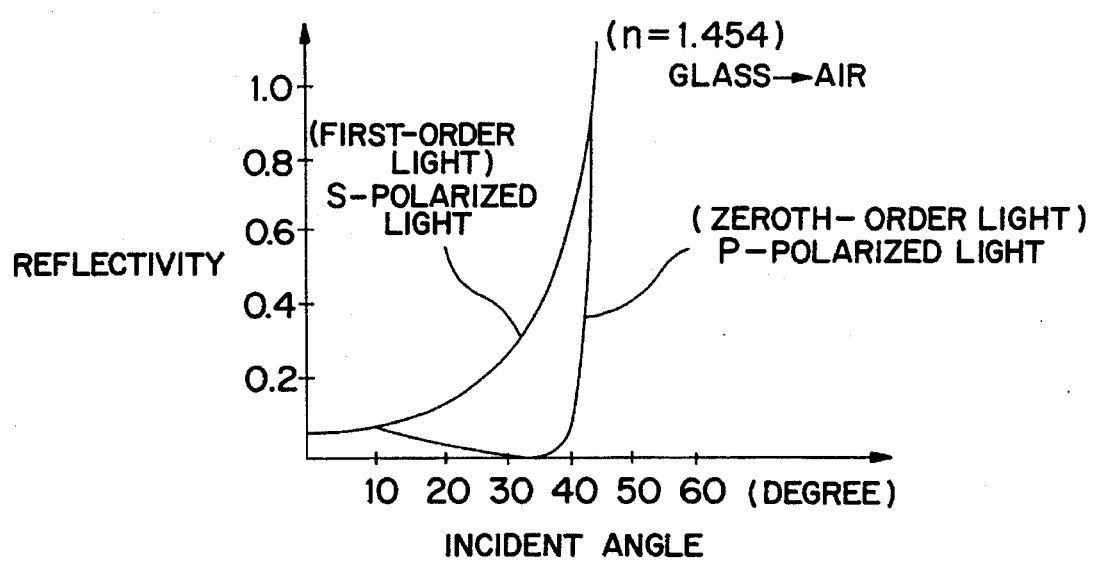
FIG. 13 is a graph showing the relationship between the incident angle and the reflectivity in the polarization diffraction element having polarization characteristics.

FIG. 1 is a plan view schematically showing part of a polarization diffraction element in a polarization detector of the first example. The polarization detector has an aperture A on the side of a first diffraction grating 12 of a polarization diffraction element 10 having the same structure as that of the polarization diffraction element 110 shown in FIG. 9. Light is incident upon the first diffraction grating 12. The aperture A is provided for the purpose of limiting an incident area of incident light L. The aperture A limits the incident area of the incident light L with respect to the polarization diffraction element 10 so that the width of the incident light L in the vertical direction on a sheet surface of FIG. 1.

The width W of the aperture A is determined by calculation as follows:

Among the incident light L, the uppermost light which is diffracted by the first diffraction grating 12 becomes a first-order diffraction light $L_1$, and among the first-order diffraction light $L_1$, light which is reflected from a second diffraction grating 13 becomes a reflected light $L_2$ and reaches a point P on the first diffraction element 12. In order to prevent the interference of light in the polarization diffraction element 10, the incident light L should not be incident upon the point P. Thus, if the width W is set so as to satisfy the following Formula (2), the interference of light in the polarization diffraction element 10 is not caused.

$$W < 2t_0 \cdot \tan\theta_2 \cdot \sin\phi_1 \qquad (2)$$

where $t_0$ is the thickness of a substrate 11 of the polarization diffraction element; $\theta_1$ is an incident angle with respect to the polarization diffraction element 10; $\theta_2$ is a diffraction angle of the incident light by the first diffraction grating 12 (in the substrate 11); and $\phi_1$ is $90°-\theta_1$.

In the polarization detector with the abovementioned structure, even though the laser driving current to be applied to the optical source is overlapped with a high frequency current, the outgoing light of an S-polarized light in the polarization diffraction element 10 is not fluctuated by the fluctuation of a wavelength of the incident light L. Thus, the noise level of a signal in a photodetector (not shown) can be decreased.

As described later, for practical use, even though the width W is twice the maximum value determined by the above-mentioned Formula (2), the noise level can sufficiently be decreased. More specifically, the same effects can be obtained, even when the width W is set so as to satisfy the following Formula (3):

$$W < 4t_0 \cdot \tan\theta_2 \cdot \sin\phi_1 \qquad (3)$$

The reason why the same effects can be obtained even when the width W is set so as to satisfy Formula (3) will be described with reference to the result of experiment.

Figure 2A:
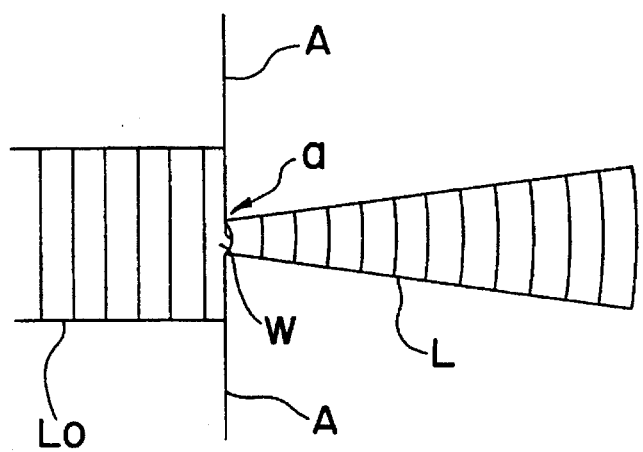
FIG. 2A is a schematic plan view of an aperture, illustrating the operation in the case where a spherical wave is incident upon the polarization diffraction element shown in FIG. 1.
Figure 2B:
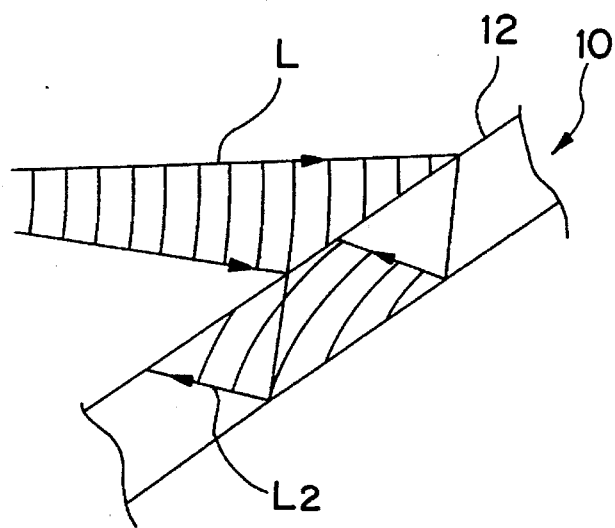
FIG. 2B is a schematic plan view of the polarization diffraction element, illustrating the operation in the case where a spherical wave is incident upon the polarization diffraction element shown in FIG. 1.
Figure 2C:
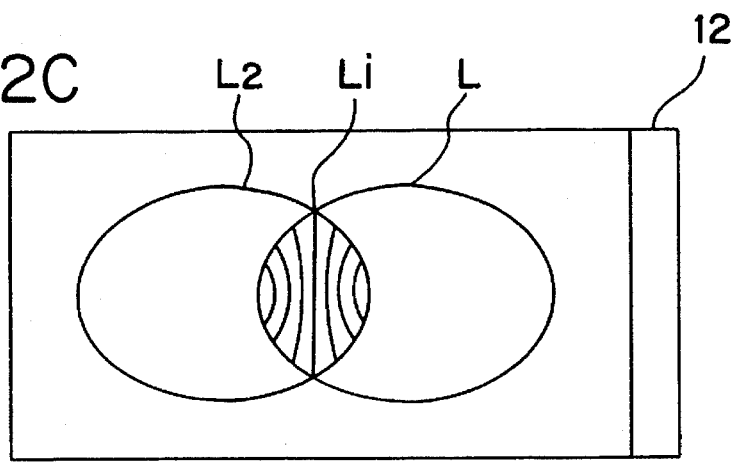
FIG. 2C is a schematic view of beam spots on a first diffraction grating, illustrating the operation in the case where a spherical wave is incident upon the polarization diffraction element shown in FIG. 1.

As shown in FIG. 2A, when the incident light $L_0$ (a plane wave) is limited by an opening a of the aperture A, the incident light L transmitted through the opening a of the aperture A is diffracted by the opening a to become nearly a spherical wave. This effect becomes larger as the width W of the opening a becomes smaller. Namely, as in the present example (FIG. 1), in the case where the incident light $L_0$ is limited by the aperture A, the incident light L with respect to the polarization diffraction element 10 (i.e., outgoing light from the aperture A) becomes a spherical wave. Because of this, as shown in FIG. 2B, both the incident light L and diffracted reflected light $L_2$ become spherical waves. As a result, in an interference portion $L_i$ of the incident light L and the diffracted reflected light $L_2$, a stripe pattern is formed as shown in FIG. 2C. This stripe pattern is generated by the interference between the spherical waves. As the incident light L and the diffracted reflected light $L_2$ become close to a spherical wave, the number of stripes in the stripe pattern observed in the interference portion $L_i$ increases. Namely, as the width W of the opening a of the aperture A becomes smaller, the number of the stripes in the interference portion $L_i$ increases. In the case where the number of the stripes is small, the intensity of light in the interference portion $L_i$ is greatly fluctuated, when the wavelength of the incident light L is fluctuated. In contrast, in the case where the number of the stripes is larger, even though the wavelength of the incident light $L_i$ is fluctuated, the position of the stripes are merely fluctuated and the fluctuation of the intensity of light in the interference light $L_i$ is decreased. As a result, the noise amount obtained by the photodetector (not shown) becomes smaller, compared with the case where the incident light L is a plane wave.

The result of experiment showing the abovementioned phenomenon will be described by illustrating exemplary values.

Figure 3:
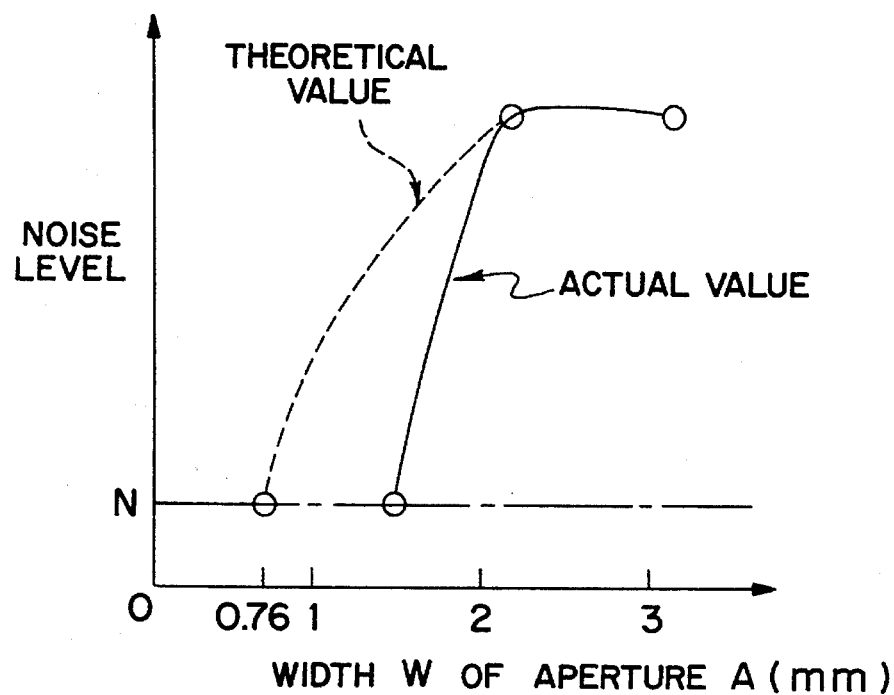
FIG. 3 is a graph showing the relationship between the width W of an aperture A and the noise level in the polarization detector shown in FIG. 1.

FIG. 3 shows the relationship between the noise level and the width W of the aperture A. This result is obtained by measuring the noise level of a signal from the photodetector, in the case where the width of the incident light L is changed to the range of 1.5 mm to 3 mm by varying the width W of the aperture A having the opening a with a circular shape. In this experiment, the polarization diffraction element 10 is used, in which the wavelength of an incident light $\lambda$=780 nm, the thickness of the substrate 11=1 mm, a refractive index n=1.454, an incident angle $\theta_1$ with respect to the polarization diffractive element 10=58°, and a diffraction angle $\theta_2$ in the substrate 11 by the first diffraction grating 12 $\theta_2$=35.68°. A noise level N refers to a noise level obtained by regulating an oscillation wavelength so as to be constant without applying a high frequency driving current to a laser which oscillates the incident light.

Under the above-mentioned conditions, a width $W_0$ of the aperture A which nullifies the noise of a signal caused by the interference in the polarization diffraction element can theoretically be obtained by Formula (2) as follows:

$$W_0 = 2 \cdot 1 \cdot \tan 35.68° \cdot \sin(90° - 58°) = 0.761 \text{ mm}$$

Thus, as represented by the broken line in FIG. 3, it is expected that a curve is formed, in which the noise level is N when the width W of the aperture A is 0.76 mm.

However, as shown by the solid line in FIG. 3, in an actual measurement, a noise is hardly caused by the interference, when the width W of the aperture A is about 1.5 mm. Namely, it is understood that a noise level is sufficiently decreased, when the width W of the aperture A is about twice the width $W_0$ at which a signal noise is theoretically nullified.

Figure 4A:
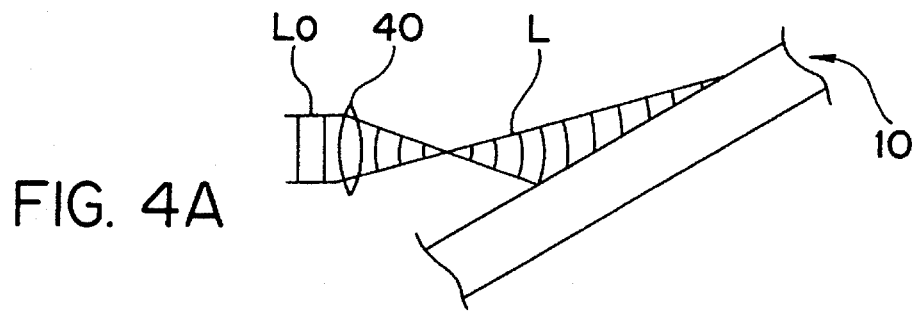
FIG. 4A is a plan view schematically showing the periphery of the polarization diffraction element, illustrating an application of the first example.
Figure 4B:
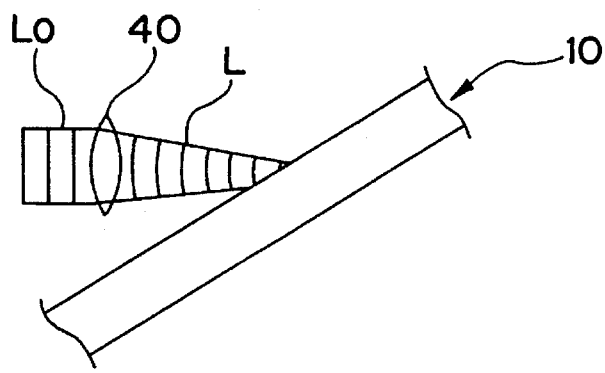
FIG. 4B is a plan view schematically showing the periphery of the polarization diffraction element, illustrating another application of the first example.
Figure 11:
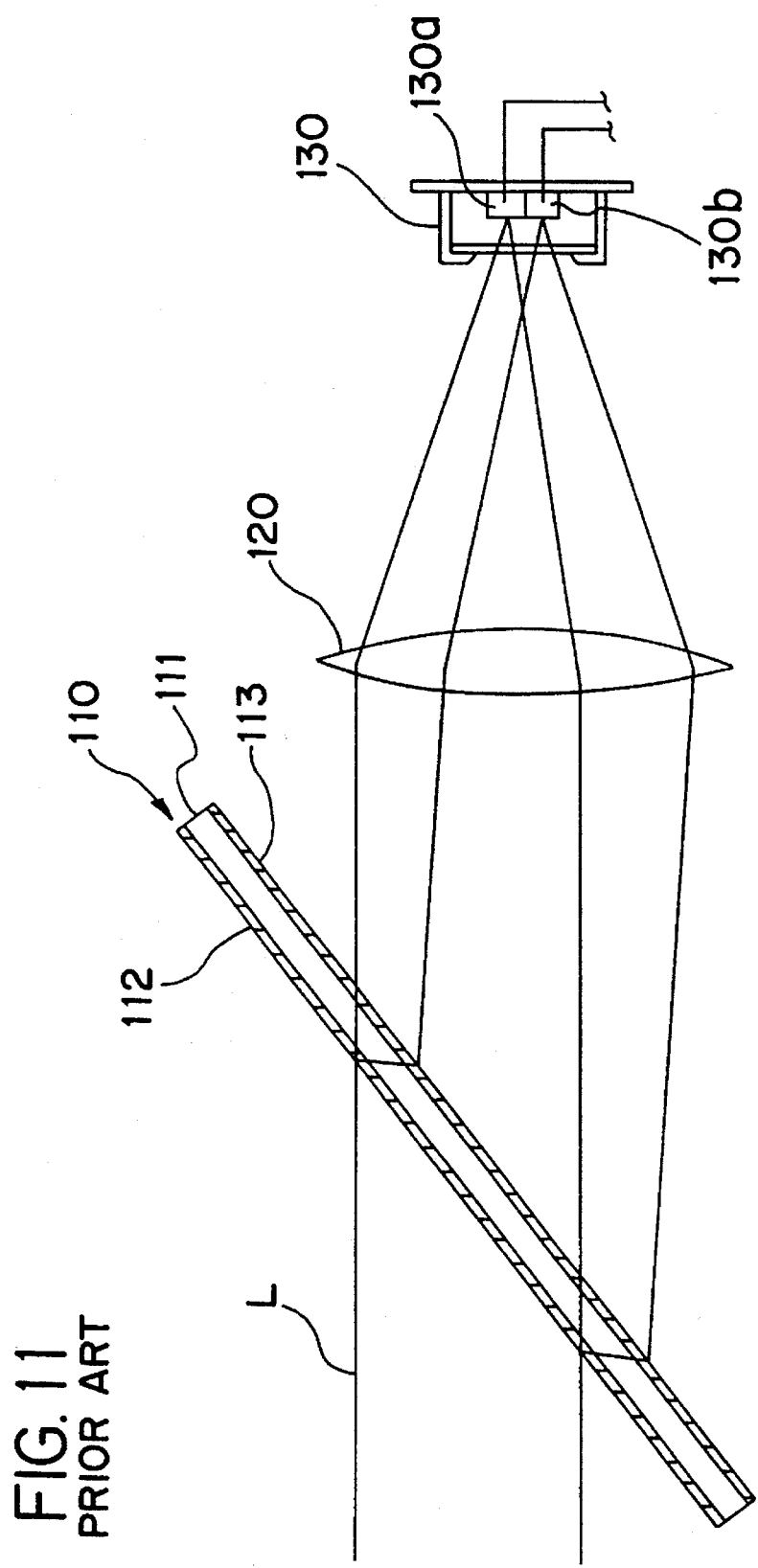
FIG. 11 is a plan view schematically showing the conventional polarization detector using the polarization diffraction element shown in FIG. 9.
Figure 12A:
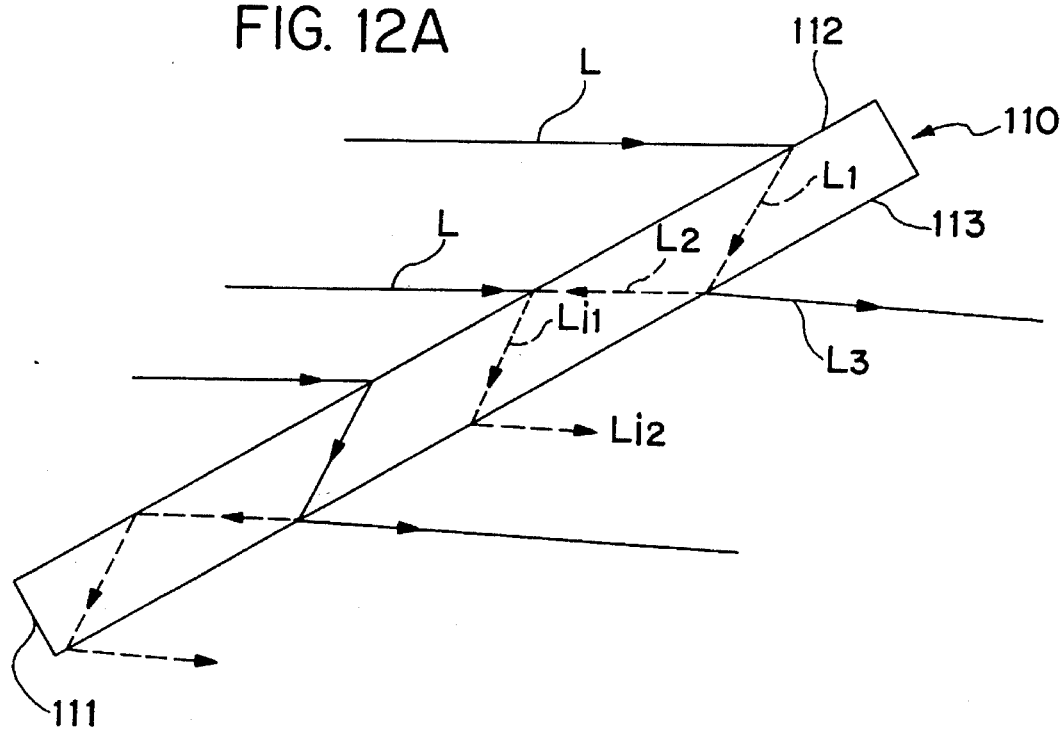
FIG. 12A is a schematic plan view showing the polarization diffraction element shown in FIG. 9, illustrating the operation of light therein.
Figure 12B:
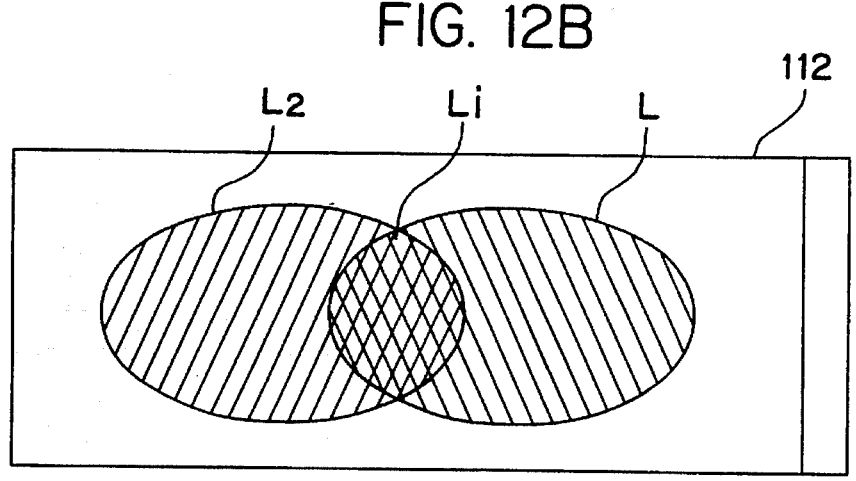
FIG. 12B is a schematic view showing beam spots on the first diffraction grating, illustrating the operation of light in the polarization diffraction element shown in FIG. 9.

Considering the above-mentioned experimental result, as shown in FIGS. 4A and 4B, a light $L_0$ is converted into a spherical wave light by a lens 40, which is the incident light L with respect to the polarization diffraction element 10, whereby a signal having a sufficiently decreased noise component can be detected without limiting the incident region of the incident light L. It is also possible that the incident light L is made into a spherical wave and the incident region is limited. According to the structure shown in FIG. 4B, it is not required to provide the converging lens 120 for converging light on the photodetectors 130a and 130b as shown in FIG. 11.

Figure 5C:
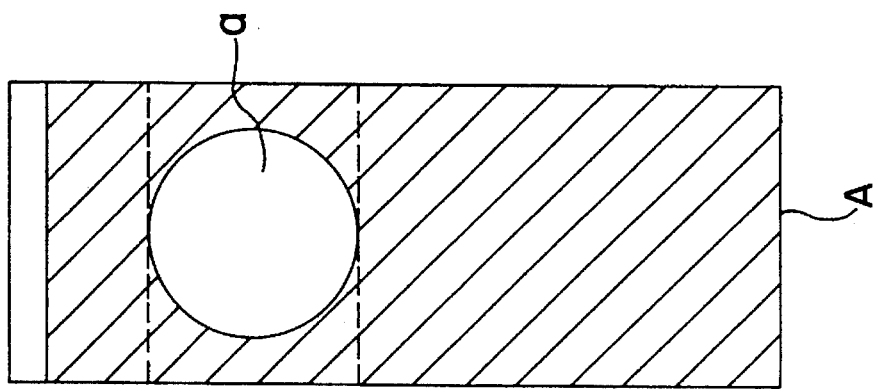
FIG. 5C shows another exemplary shape of the aperture opening used in the polarization detector shown in FIG. 1.
Figure 5B:
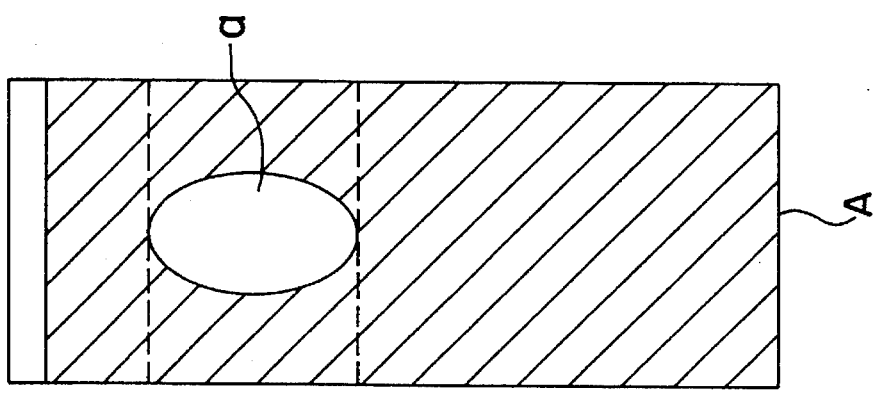
FIG. 5B shows another exemplary shape of the aperture opening used in the polarization detector shown in FIG. 1.
Figure 5A:
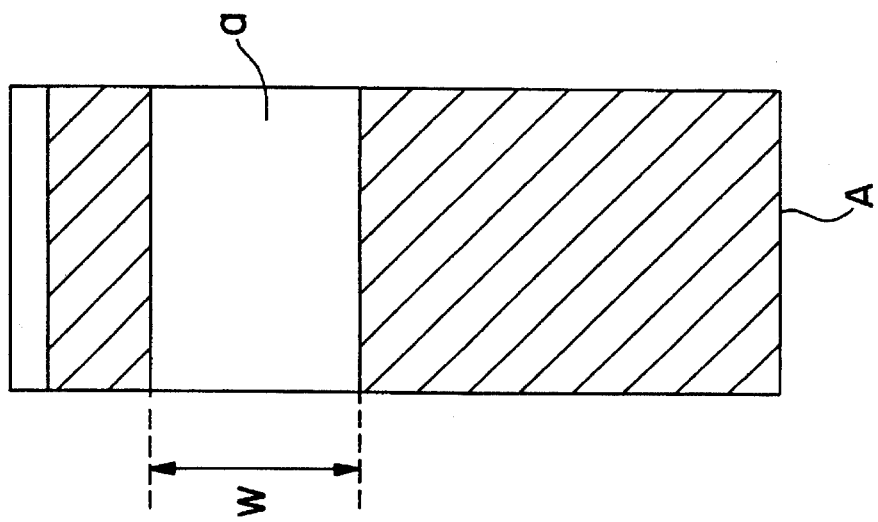
FIG. 5A shows an exemplary shape of an aperture opening used in the polarization detector shown in FIG. 1.

As shown in FIGS. 5A through 5C, in the present example, the shape of the opening a of the aperture A can be a slit, an oval, a circle, etc. Any shape can be used as long as the opening a with the width W is present in the vertical direction of the figures. The slit-shaped opening a shown in FIG. 5A is easily produced; however, the shape of converted beam spots in the photodetector is not satisfactory. In order to form the most satisfactory shape of the converted beam spot, it is desired that the cross-section of the incident light L is made circular as shown in FIG. 5C.

EXAMPLE 2

Figure 6:
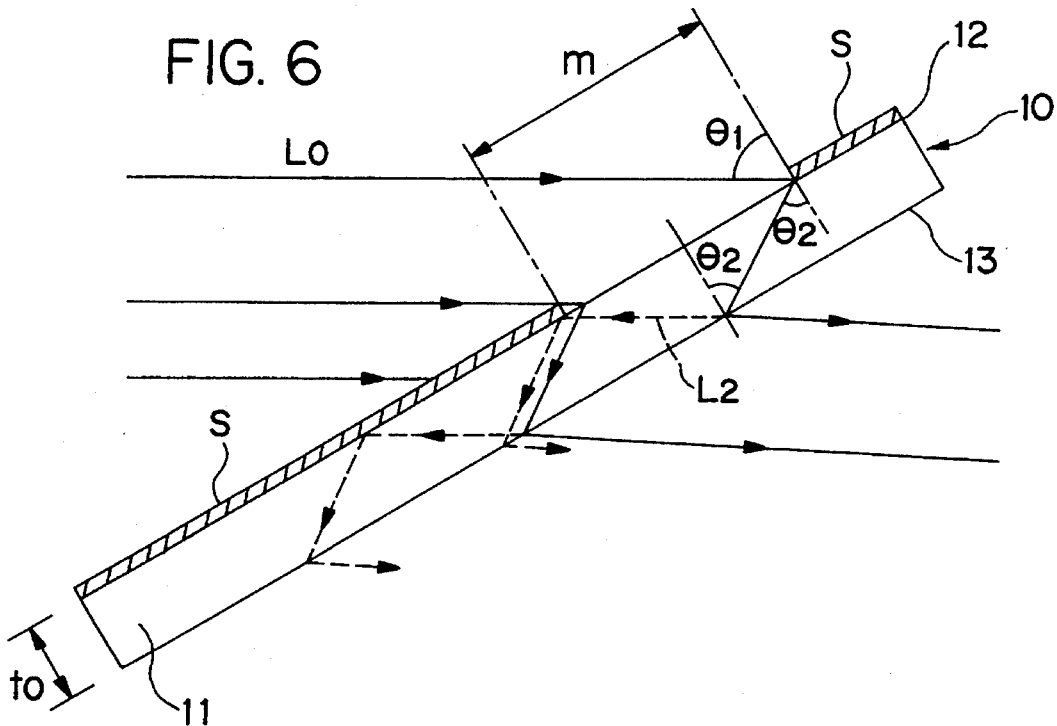
FIG. 6 is a plan view schematically showing the periphery of the polarization diffraction element in a polarization detector of the second example according to the present invention.

FIG. 6 is a plan view schematically showing a polarization detector of a second example. In the polarization detector, a light-intercepting seal S is attached to the light incident side of the first diffraction grating 12 of the polarization diffraction element 10 having the same structure as that of the polarization diffraction element 110 shown in FIG. 9. The light-intercepting seal S is provided for the purpose of limiting the incident region of the incident light L. The light-intercepting seal S is provided with an opening with a width m in the vertical direction with respect to the groove direction of the first diffraction grating 12. Light is incident upon the polarization diffraction element 10 only through this opening.

The width m is determined by calculation as follows:

In order to prevent the interference of light in the polarization diffraction element 10, the width m can be set so as to satisfy the following Formula (4) in the same way as in Example 1.

$$m < 2t_0 \cdot \tan\theta_2 \quad (4)$$

In the polarization detector having the above-mentioned structure, the same effects as those in Example 1 can be obtained.

In the case where the polarization detector is realized using a structure in which a lens is provided on the light incident side of the polarization diffraction element 10 as shown in FIGS. 4A and 4B, since the incident light L with respect to the polarization diffraction element 10 is nearly a spherical wave, the interference of light can be prevented even though the width m is about twice the maximum value obtained by Formula (4). Namely, the width m can be set so as to satisfy the following Formula (5).

$$m < 4t_0 \cdot \tan\theta_2 \quad (5)$$

The shape of the opening of the light-intercepting seal S can be a slit, an oval, a circle, etc. Any shapes can be used as long as the width m of the opening is present in the vertical direction with respect to the groove direction of the first diffraction gating 12 as shown in FIG. 6.

Figure 7:
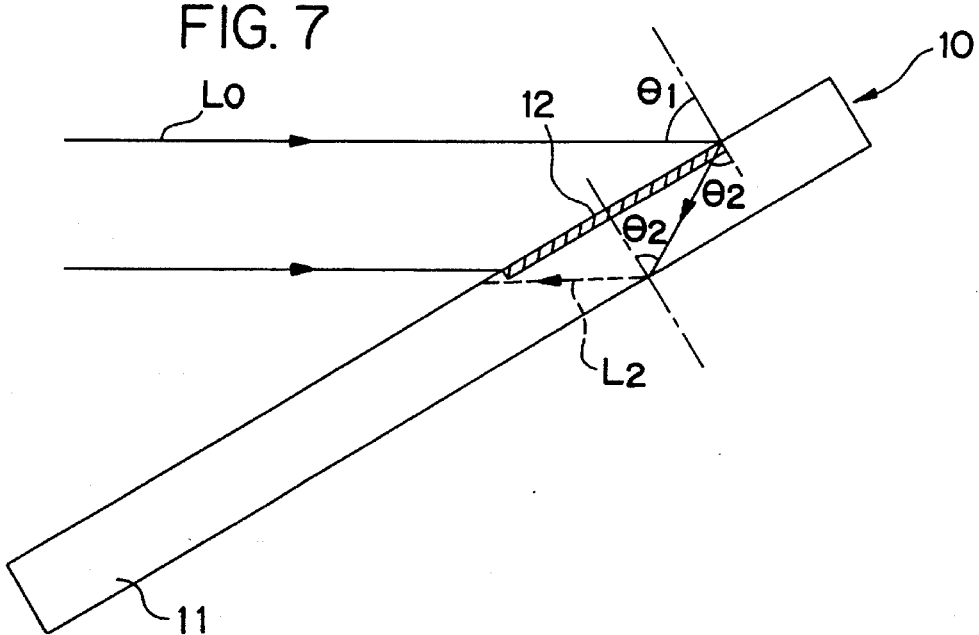
FIG. 7 is a plan view schematically showing the application of the polarization diffraction element of the second example according to the present invention.
Figure 8:
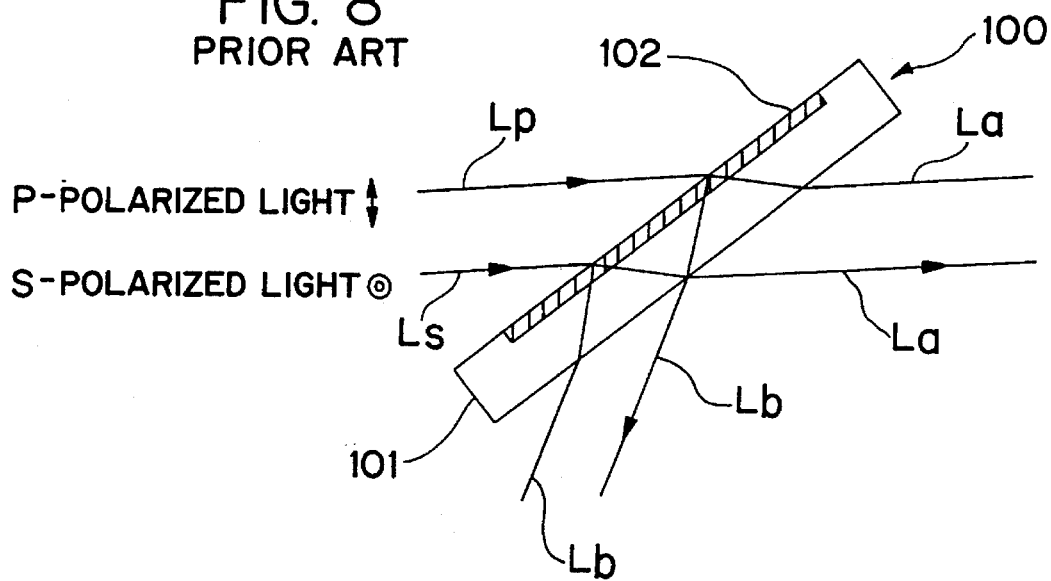
FIG. 8 is a plan view showing a conventional polarization diffraction element having polarization characteristics.

Moreover, the material for the light-intercepting member is not limited to a seal. For example, even though a coating for preventing light transmission is provided on the light incident surface of the polarization diffraction element 10, the same effects as those of the light-intercepting seal S can be obtained. Alternatively, as shown in FIG. 7, the following is also possible: The first diffraction grating 12 is formed so as to be smaller than the range of the substrate 10 to which the incident light L reaches, i.e., the first diffraction grating 12 is formed so as to have the above-mentioned width m, thereby preventing the diffracted reflected light $L_2$ from reaching the inside of the first diffraction grating 12.

In this case, when the incident light is nearly a spherical wave, the width m is determined by Formula (5).

EXAMPLE 3

In a polarization detector of the third example, the interference of light in the polarization diffraction grating 10 is prevented by modifying the design of the polarization diffraction element 10 shown in FIG. 1 or 6, instead of limiting the incident light by using the light-intercepting seal S or the aperture A as described in the above-mentioned examples.

A method for designing the polarization diffraction element 10 will be described.

Assuming that the width of an incident light (which is incident upon the first diffraction grating 12 of the polarization diffraction element 10) in the vertical direction of FIG. 1 or 6 is $W_0$, a thickness t of the substrate 11 forming the polarization diffraction element 10 should satisfy the following Formula (6):

$$t > W_0/(2\tan\theta_2 \cdot \sin\phi_1) \qquad (6)$$

When the incident light is nearly a spherical wave, the thickness t which satisfies the following Formula (7) can be used in the same way as in the other examples.

$$t > W_0/(4\tan\theta_2 \cdot \sin\phi_1) \qquad (7)$$

In the present example, the same effects as those of the other examples can be obtained without limiting the incident region of light with respect to the polarization diffraction grating 10.

As described above, in the polarization detector of the present invention, the interference between the incident light and the diffracted reflected light of the incident light can be prevented or the influence of the light interference can be eliminated. Thus, the intensity of light is not fluctuated on the photodetector along with the fluctuation of the wavelength of a laser beam, and a satisfactory data signal with less noise component can be detected.

Various other modifications will be apparent to, and can be readily made by, those skilled in the art without departing from the scope and spirit of this invention. Accordingly, it is not intended that the scope of the claims appended hereto be limited to the description as set forth herein, but rather that the claims be broadly construed.

What is claimed is:

1. A polarization detector, comprising:

a polarization diffraction element having a substrate with two facing surfaces which are in parallel with each other, a first diffraction grating formed on one surface of the substrate, and a second diffraction grating formed on the other surface of the substrate, light being incident upon the first diffraction grating, each grating pitch of the first diffraction grating and the second diffraction grating being nearly equal to a wavelength of the incident light;

limiting means for limiting an incident region of the incident light with respect to the polarization diffraction element, formed on a light incident side of the first diffraction grating;

converging means for respectively converging light transmitted through the first diffraction grating and the second diffraction grating and light diffracted by the first diffraction grating and the second diffractions grating into different beam spots; and a pair of photodetecting means for detecting each optical intensity of the two beam spots converged by the converging means, wherein the limiting means is formed of a light-intercepting member, and on a surface of the polarization diffraction element on which the first diffraction grating is formed, the light-intercepting member limits an incident width of the incident light to a limit width thereof in a vertical direction with respect to a groove direction of the first diffraction grating.

2. A polarization detector according to claim 1, wherein in the light-intercepting member is formed of a light-intercepting film formed on the first diffraction grating.

3. A polarization detector according to claim 1, wherein the light-intercepting member is formed so as to prevent interference between light diffracted by the first diffraction grating and reflected from the other surface of the substrate and the incident light.

4. A polarization detector according to claim 3, wherein the light-intercepting member is formed of a light-intercepting film formed on the first diffraction grating.

5. A polarization detector according to claim 1, wherein in the limit width is $4t_0 \cdot \tan\theta_2$ or less, where $t_0$ is a thickness of the substrate of the polarization diffraction element and $\theta_2$ is a diffraction angle of the incident light in the substrate by the first diffraction grating.

6. A polarization detector, comprising:

a polarization diffraction element having a substrate with two facing surfaces which are in parallel with each other, a first diffraction grating formed on one surface of the substrate, and a second diffraction grating formed on the other surface of the Substrate, light being incident upon the first diffraction grating, each grating pitch of the first diffraction grating and the second diffraction grating being nearly equal to a wavelength of the incident light;

limiting means for limiting an incident region of the incident light with respect to the polarization diffraction element, formed on a light incident side of the first diffraction grating;

converging means for respectively converging light transmitted through the first diffraction grating and the second diffraction grating and light diffracted by the first diffraction grating and the second diffraction grating into different beam spots; and a pair of photodetecting means for detecting each optical intensity of the two beam spots converged by the converging means, wherein the limiting means is formed of an aperture and limits a width of the incident light to a limit width thereof on a surface vertical with respect to a proceeding direction of the incident light, said limit width being $4t_0 \cdot \tan\theta_2 \cdot \sin(90°-\theta_1)$ or less, where $t_0$ is a thickness of the substrate of the diffraction grating element, $\theta_1$ is an incident angle of the incident light, and $\theta_2$ is a diffraction angle of the incident light in the substrate by the first diffraction grating.

7. A polarization detector according to claim 6, wherein a conversion means is further formed on a light incident side of the first diffraction grating, the conversion means converting the incident light to a spherical wave and allowing the spherical wave to be incident upon the polarization diffraction element.

8. A polarization detector according to claim 7, wherein the conversion means is selected from the group consisting of a lens and an aperture.

9. A polarization detector according to claim 6, wherein the converging means is provided on the light incident side of the polarization diffraction element.

10. A polarization detector according to claim 6, wherein the converging means is provided on the light outgoing side of the polarization diffraction element.

11. A polarization detector, comprising:

a polarization diffraction element having a substrate with two facing surfaces which are in parallel with each other, a first diffraction grating formed on one surface of the substrate, and a second diffraction grating formed on the other surface of the substrate, light being incident upon the first diffraction grating, each grating pitch of the first diffraction grating and the second diffraction grating being nearly equal to a wavelength of the incident light, the first diffraction grating being formed with a width of $4t_0 \cdot \tan\theta_2$ or less in a vertical direction with respect to a groove direction of the first diffraction grating, where $t_O$ is a thickness of the substrate and $\theta_2$ is a diffraction angle of the incident light in the substrate by the first diffraction grating;

converging means for respectively converging light transmitted through the first diffraction grating and the second diffraction grating and light diffracted by the first diffraction grating and the second diffraction grating into different beam spots; and a pair of photodetecting means for detecting each optical intensity of the two beam spots converged by the converging means.

12. A polarization detector, comprising:

a polarization diffraction element having a substrate with two facing surfaces which are placed in parallel with each other, a first diffraction grating formed on one surface of the substrate, and a second diffraction grating formed on the other surface of the substrate, light with a wavelength which is to fluctuate being incident upon the first diffraction grating, each grating pitch of the first diffraction grating and the second diffraction grating being nearly equal to a wavelength of the incident light, a thickness of the substrate being $W_O/\{4\tan\theta_2\cdot\sin(90°-\theta_1)\}$ or more, where $W_O$ is a width of the incident light on a surface vertical with respect to a proceeding direction of the incident light, $\theta_1$ is an incident angle of the incident light, and $\theta_2$ is a diffraction angle of the incident light in the substrate by the first diffraction grating;

converging means for respectively converging light transmitted through the first diffraction grating and the second diffraction grating and light diffracted by the first diffraction grating and the second diffraction grating into different beam spots; and a pair of photodetecting means for detecting each optical intensity of the two beam spots converged by the converging means.

\* \* \* \* \*